(12) United States Patent
Hoffman

(10) Patent No.: US 6,189,137 B1
(45) Date of Patent: Feb. 13, 2001

(54) DATA PROCESSING SYSTEM AND METHOD FOR SIMULATING "INCLUDE" FILES IN JAVASCRIPT

(75) Inventor: Richard Dale Hoffman, Austin, TX (US)

(73) Assignee: International Business Machines Corporation, Armonk, NY (US)

( * ) Notice: Under 35 U.S.C. 154(b), the term of this patent shall be extended for 0 days.

(21) Appl. No.: 08/976,407

(22) Filed: Nov. 21, 1997

(51) Int. Cl.$^7$ ........................................................ G06F 9/45
(52) U.S. Cl. ........................................................ 717/1; 717/5
(58) Field of Search ................................. 395/701–703, 395/705, 710; 707/531; 709/305, 331; 717/1–3, 5, 10

(56) References Cited

U.S. PATENT DOCUMENTS

| | | | |
|---|---|---|---|
| 3,568,158 | * 3/1971 | Haller et al. | |
| 4,089,059 | * 5/1978 | Miller et al. | |
| 4,802,165 | 1/1989 | Ream | 371/19 |
| 5,093,916 | * 3/1992 | Karp et al. | 709/305 |
| 5,247,651 | * 9/1993 | Clarisse | 395/500 |
| 5,421,004 | 5/1995 | Carpenter et al. | 395/575 |
| 5,446,878 | 8/1995 | Royal | 395/180 |
| 5,495,613 | * 2/1996 | Brody | 395/710 |
| 5,815,716 | * 9/1998 | Horiguchi | 395/705 |
| 5,819,092 | * 10/1998 | Ferguson et al. | 395/701 |
| 5,854,930 | * 12/1998 | McLain, Jr. et al. | 395/705 |
| 5,875,331 | * 2/1999 | Lindsey | 395/702 |
| 5,944,784 | * 8/1999 | Simonoff et al. | 709/203 |

OTHER PUBLICATIONS

Bentley et al., "Programming Pearls" Comm. of the ACM, Jun. 1986, pp471–483.*

Engler, "VCODE : A retargetable, extensible, very fast dynamic code generation system", PLDI '96, ACM, 1996, pp 160–170.*

Housel et al., "WebExpress : A system for optimizing web browsing in a wireless environment" MOBICOM '96, ACM, 1996, pp 108–116.*

"Full–Featured, Open Stardards–Based Email", Netscape Communicator• | Messenger, available via the Internet, Copyright 1997 Netscape Communications Corporation, this site powered by Netscape SuiteSpot servers, attached copy printed Oct. 7, 1997, pp. 1–2.

"Handbook: Mail, News, and Bookmarks", available via the Internet at info@netscape.com, Copyright 1994–1996 Netscape Communications Corporation, attached copy printed Oct. 7, 1997, pp. 1–13.

Samuel P. Harbison et al., Sec. 3.3 Definition and Replacement, *C A Reference Manual*, Third Edition, pp. 43–45.

"Understanding Client Configuration", available via the Internet at wysiwyg://content.124/http://developer.n . . . com/library/documentation/ant/config.html, Copyright 1997 Netscape Communications Corporation, attached copy printed Jun. 16, 1997, pp. 1–7.

Andrew Wooldridge et al., Chapter 24, *Using JavaScript— Second Edition*, Copyright 1997, pp. 637–655.

* cited by examiner

*Primary Examiner*—Kakali Chaki
(74) *Attorney, Agent, or Firm*—Winstead Sechrest & Minick P.C.; Jeffrey S. LaBaw

(57) ABSTRACT

A data processing system and methodology simulate "include" function in the JavaScript programming language. The include function is utilized to more efficiently use a set of instructions that are repeated during execution of a program. By setting those instructions in a single file that is then called through the use of a JavaScript subroutine calling protocol, sets of instructions may be repeatedly accessed and executed in a manner that simulates the include function provided by other programming languages.

23 Claims, 3 Drawing Sheets

DATA PROCESSING SYSTEM AND METHOD FOR SIMULATING "INCLUDE" FILES IN JAVASCRIPT

COPYRIGHT NOTIFICATION

A portion of the disclosure of this document contains material which is subject to copyright protection. A copyright owner has no objection to the facsimile reproduction by anyone of the patent document or the patent disclosure, as it appears in the Patent and Trademark Office patent file or records, but otherwise reserves all copyright works whatsoever.

TECHNICAL FIELD

The present invention relates in general to a communication network, and in particular, to a programming function for use within the communication network.

BACKGROUND INFORMATION

The worldwide network of computers, commonly known as the "Internet," has seen explosive growth in the last several years. This growth has been typically fueled by the introduction and widespread use of "web" browsers that allow for simple graphical user interface-based access to network servers. Such network servers typically support documents formatted as "web pages." The "World Wide Web" (www) is a collection of servers on the Internet that utilize the Hypertext Transfer Protocol (HTTP), a known application protocol that provides users access to files using a standard page description language referred to as Hypertext Markup Language (HTML). It should be noted that files may be provided in different formats such as text, graphics, images, sound, and video, among others. HTML provides basic document formatting and allows a developer to specify "links" to other servers and files. Use of an HTML-compliant client browser involves specification of a link via a Uniform Resource Locator, commonly known by the acronym, "URL." Upon specification of a URL, a client may make a TCP/IP request to the server identified in the link and receive a "web page" in return, where the "web page" is a document formatted according to HTML.

FIG. 1 illustrates a communication network based on a client-server model typically utilized in the Internet. Conceptually, the Internet comprises a large network of "sites" 110 that are accessible by "clients" 112. Each of the plurality of clients 112 is typically a user of a personal computer. Clients 112 may access the Internet through some private Internet access provider 114 (such as Internet America™) or an on-line service provider 116 (such as America On-Line™, Prodigy™, Microsoft Network™, and the like). Alternatively, a client 112 may have a direct connection (not illustrated) to sites 110. Access provider 114, service provider 116, and any direct connection (not illustrated) will hereinafter be collectively referred to as the web servers. Each of the clients 112 may run a "browser," which is a known software tool used to access the sites 110 via the web servers (114 and 116). Each site 110 may selectively operate one or more "web sites" or servers that support files in the form of documents and pages. A network path to a server is identified by a uniform resource locator (URL) having a known syntax for defining a network connection. As previously mentioned, URLs may be utilized to specify a link from the user to another server or file. Upon specification of a link, one of the clients 112 makes a TCP/IP request to one of the plurality of sites 110 identified in the link and receives a web page (specifically, a document formatted according to HTML) in return.

In addition to HTML, web servers (114, 116) may access programs other than HTML from a web site 110. In this role, the web servers are acting more like clients, than typical servers. Rather, in some instances, the web server (114, 116) accesses information written in a programming language referred to as JavaScript. JavaScript is a programming language that is often used in Internet applications as it provides a more flexible method for interfacing with browsers used by clients 112. When site 110 provides information in JavaScript to the web server (114, 116), the web server (114, 116) interprets the JavaScript to generate instructions that form a web page. The web server (114, 116) then sends the formatted web page to the browser used by client 112. To client 112, the web page appears as though it was retrieved from a web site 110.

As users of the Internet have grown more sophisticated, these users are demanding more dynamic interaction with web sites and no longer want merely static lists of impersonal information. For this reason, use of JavaScript by web sites has become more common as JavaScript provides such interactive capabilities. With the increased use of JavaScript, the inadequacies of that programming language have become increasingly noticeable. Specifically, JavaScript is a sparse programming language that fails to include many of the functions implemented in other programming languages, such as "C". For instance, C and even older programming languages such as COBOL, implement an "include" function. An include function identifies a set of instructions that are executed in more than one program, and allows these instructions to be "included" in the body of each program without having to be recoded.

Stated another way, include functions provide a shorthand method for implementing operating groups of instructions. Therefore, instead of programming each of the programs with this set of instructions, the instructions are placed in a file and the instructions in the file are then executed when an include function is executed and services the file. For this reason, such include files are particularly useful in defining the value of constants utilized during program execution. For more information on the include function implemented by the "C" programming language, refer to *C; A Reference Manual,* by Harbison, et al., published by Prentice Hall, 1991, pp. 43–45. As previously mentioned, JavaScript is a sparse programming language that fails to perform an include function and, thus, traditional programming implementations that require sets of instructions must provide separate coding for those instructions in a tedious and time consuming manner.

While such include files are useful and often used during programming operations, JavaScript fails to include a similar type function in its programming capabilities. Therefore, a need exists for a method and data processing system that allow a programmer to include repeated sections of programming code in an efficient and easily-usable manner.

SUMMARY OF THE INVENTION

The previously mentioned needs are fulfilled with the present invention. Accordingly, there is provided, in a first form, a method for simulating an instruction using a scripting programming language. The method includes the step of receiving a first plurality of instructions in a first computer program. The first computer program is written in the scripting programming language. The method also includes the steps of detecting a first function instruction in the first plurality of instructions and executing a subroutine in response to the first function instruction. The subroutine retrieves a plurality of values in the scripting programming language and simulates the instruction using the plurality of values.

Additionally, there is provided, in a second form, a method for simulating an include function using an interpreted programming language. The method includes the step of retrieving a plurality of instructions corresponding to a first application. A first one of the plurality of instructions identifies a first function instruction. The method also includes the steps of enabling a first data processing device to execute a subroutine in response to the first function instruction, enabling the first data processing device to access a file in response to execution of the subroutine, and retrieving a plurality of values in the interpreted programming language from the file.

Furthermore, there is provided, in a third form, a data processing system for executing a computer program. The data processing system includes a device for receiving a first plurality of instructions in a first computer program. The first computer program is written in the scripting programming language. The data processing system also includes a device for detecting a first function instruction in the first plurality of instructions and a device for executing a subroutine in response to the first function instruction. The subroutine retrieves a plurality of values in the scripting programming language and simulates the instruction using the plurality of values.

These and other features, and advantages, will be more clearly understood from the following detailed description taken in conjunction with the accompanying drawings. It is important to note the drawings are not intended to represent the only form of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
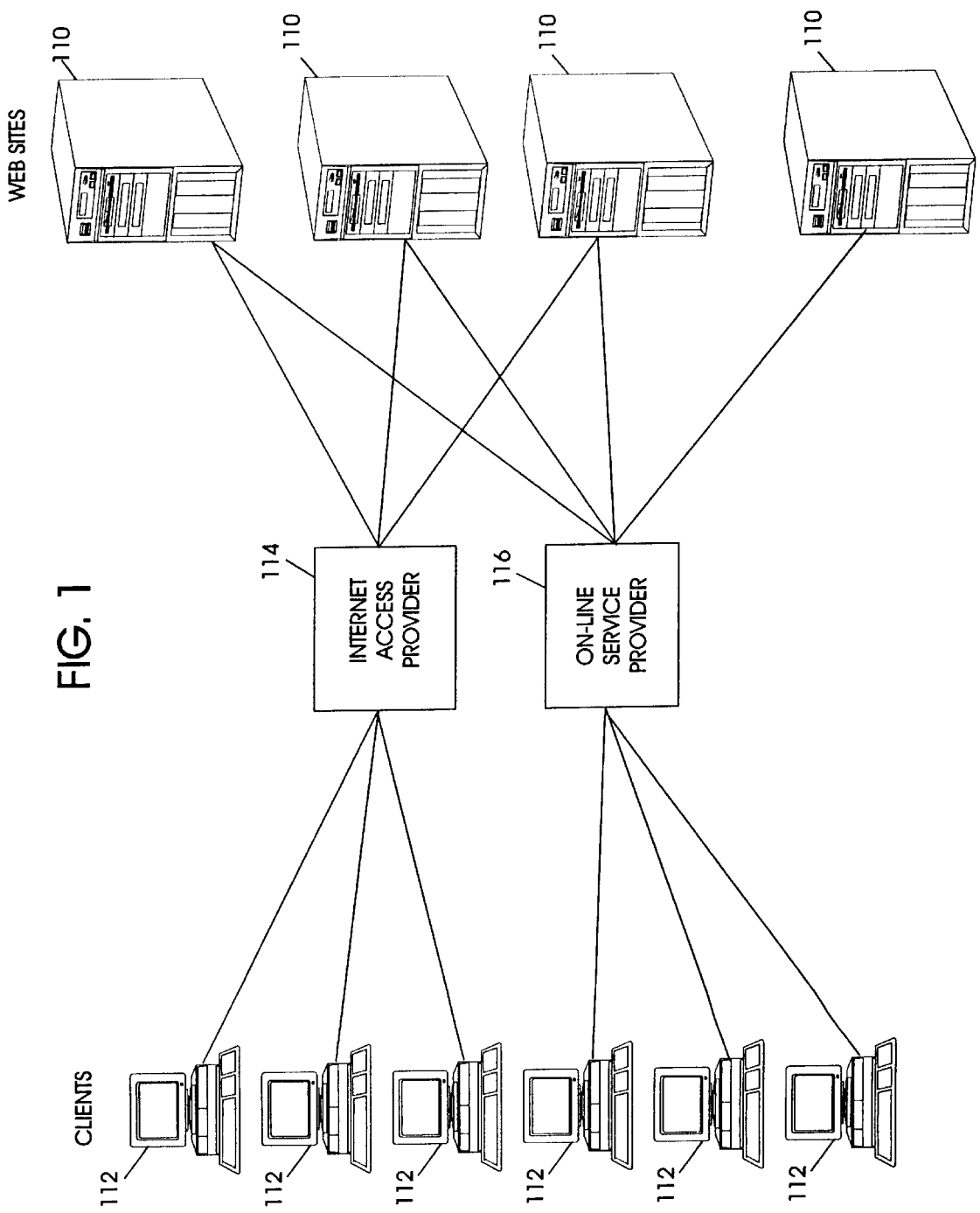
FIG. 1 illustrates, in block diagram form, a communication network.

The present invention implements a data processing system and methodology for simulating an "include" function in the JavaScript programming language. Other programming languages that do not implement the include function may also utilize the concepts of the present invention. In one embodiment of the present invention, a set of instructions that are often repeated is included in a single file with a program to be executed. The single file is then called through the use of a subroutine calling protocol established by JavaScript. By using this methodology to access and execute sets of instructions, an "include" function is simulated and a programmer is not required to repeatedly provide the same set of instructions.

Furthermore, the present invention advantageously uses the scoping rules associated with the JavaScript programming language. Generally, in a programming language, the scope of a variable name corresponds to a time span or set of programs in which that name will be defined. More specifically, in JavaScript, the scope of a name, or constant, is a length of time required to serve a particular web page to the user. In one embodiment of the present invention written in JavaScript, the include function could be executed at the top of each retrieved web page to define values for constants in a consistent and efficient manner. Furthermore, even if a user modifies a value of a constant retrieved in one web page, that modification will not affect the results or information provided by a next page. Implementation and use of the include functions within a JavaScript file will subsequently be described in greater detail.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 2:
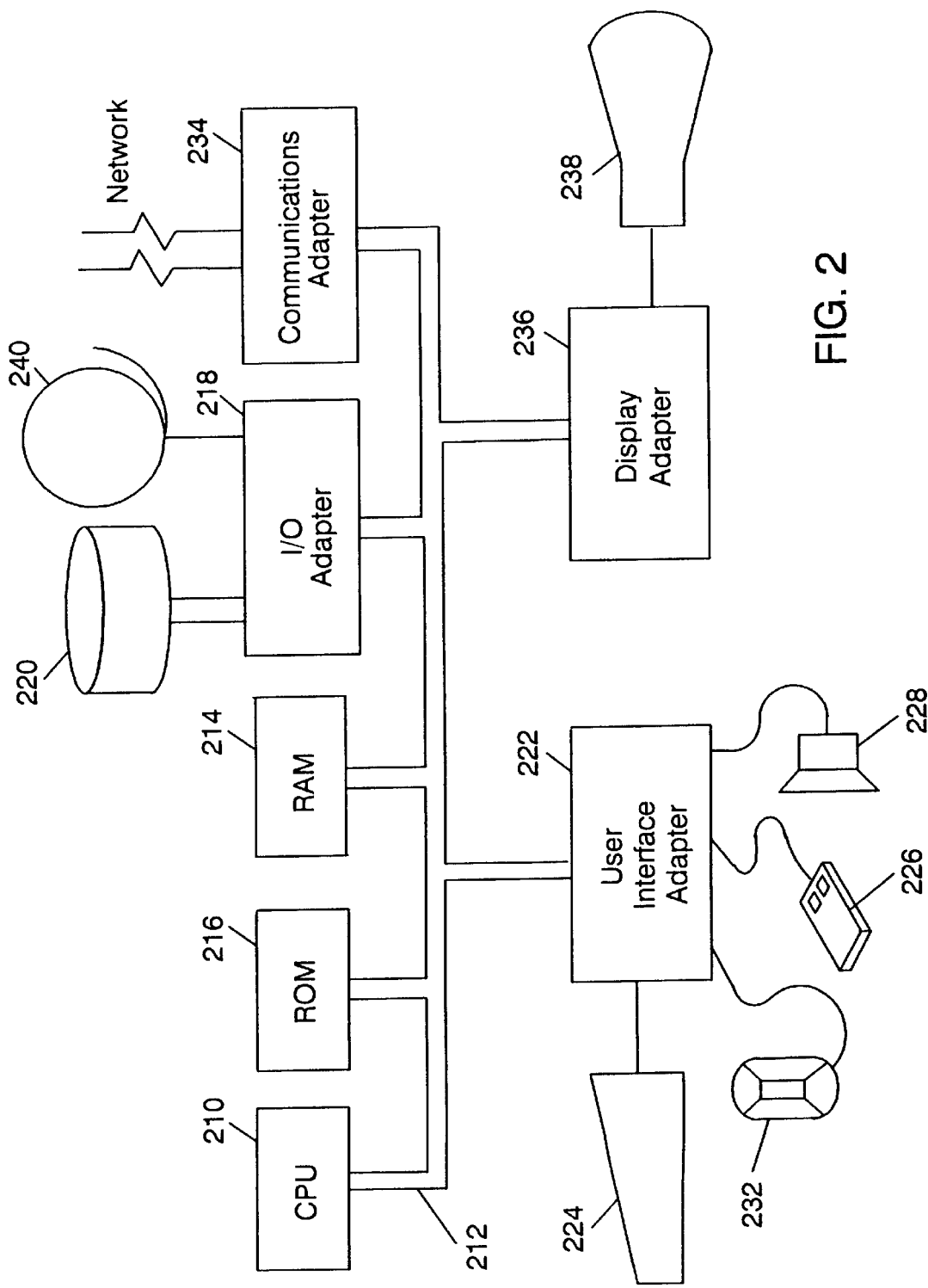
FIG. 2 illustrates, in block diagram form, a data processor in accordance with one embodiment of the present invention.

A general environment in which the communication network and methodology of the present invention may be implemented is illustrated in FIG. 1, which has been previously discussed. FIG. 2 illustrates a data processing system which may be implemented by one of web servers 114 and 116.

Referring first to FIG. 2, an example is shown of a data processing system 200 which may be used for the invention. The system has a central processing unit (CPU) 210, such as a PowerPC microprocessor ("PowerPC" is a trademark of IBM Corporation) according to "The PowerPC Architecture: A Specification for a New Family of RISC Processors", 2d edition, 1994, Cathy May, et al. Ed., which is hereby incorporated herein by reference. A more specific implementation of a PowerPC microprocessor is described in the "PowerPC 604 RISC Microprocessor Users Manual", 1994, IBM Corporation, which is hereby incorporated herein by reference. The history buffer (not shown) of the present invention is included in CPU 210. The CPU 210 is coupled to various other components by system bus 212. Read only memory ("ROM") 216 is coupled to the system bus 212 and includes a basic input/output system ("BIOS") that controls certain basic functions of the data processing system 200. Random access memory ("RAM") 214, I/O adapter 218, and communications adapter 234 are also coupled to the system bus 212. I/O adapter 218 may be a small computer system interface ("SCSI") adapter that communicates with a disk storage device 220. Communications adapter 234 interconnects bus 212 with an outside network enabling the data processing system to communication with other such systems. Input/Output devices are also connected to system bus 212 via user interface adapter 222 and display adapter 236. Keyboard 224, track ball 232, mouse 226 and speaker 228 are all interconnected to bus 212 via user interface adapter 222. Display monitor 238 is connected to system bus 212 by display adapter 236. In this manner, a user is capable of inputting to the system throughout the keyboard 224, trackball 232 or mouse 226 and receiving output from the system via speaker 228 and display 238. Additionally, an operating system such as AIX ("AIX" is a trademark of the IBM Corporation) is used to coordinate the functions of the various components shown in FIG. 2.

Preferred implementations of the invention include implementations as a computer system programmed to execute the method or methods described herein, and as a computer program product. According to the computer system implementation, sets of instructions for executing the method or methods are resident in the random access memory 214 of one or more computer systems configured generally as described above. Until required by the computer system, the set of instructions may be stored as a computer program product in another computer memory, for example, in disk drive 220 (which may include a removable memory such as an optical disk or floppy disk for eventual use in the disk drive 220). Further, the computer program product can also be stored at another computer and transmitted in a computer readable medium when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change. While it is convenient to describe the invention in terms of instructions, symbols, characters, or the like, the reader should remember that all of these and similar terms should be associated with the appropriate physical elements.

Note that the invention describes terms such as comparing, validating, selecting or other terms that could be associated with a human operator. However, for at least a number of the operations described herein which form part of the present invention, no action by a human operator is desirable. The operations described are, in large part, machine operations processing electrical signals to generate other electrical signals.

Figure 3:
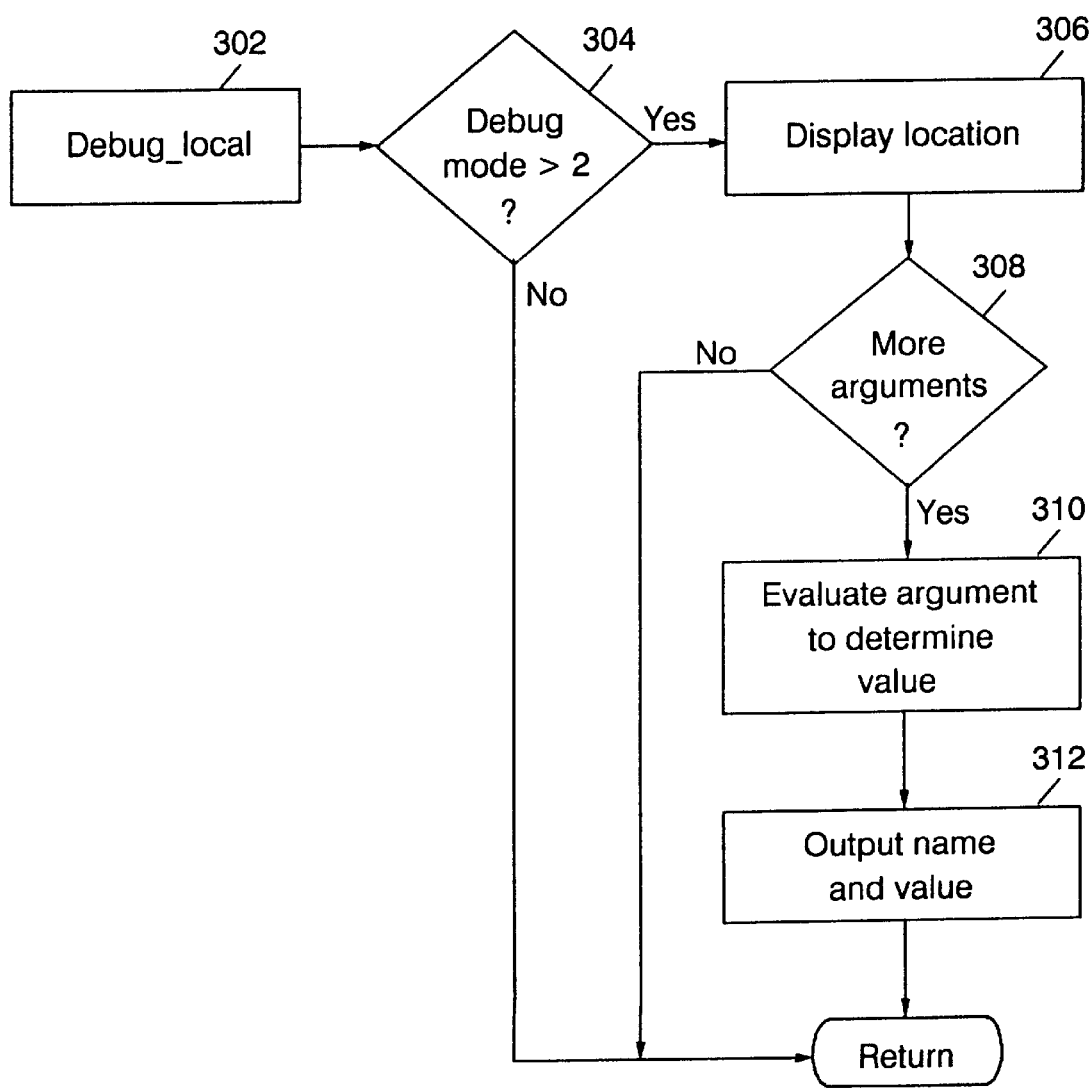
FIG. 3 illustrates, in flow diagram form, a methodology implemented in accordance with one embodiment of the present invention.

FIG. 3 illustrates a flowchart of the methodology implemented in one embodiment of the present invention. In the flowchart of FIG. 3, the steps utilized to implement the present invention are generally described. In a first step 302, one of the web servers (114, 116) accesses a JavaScript program from one of the plurality of web sites 110. To access the JavaScript program, the TCP/IP protocol is typically utilized. As is known in the data processing art, a TCP/IP protocol comprises a series of requests and responses between the requestor and the destination that are specified in a URL. The URL defines a protocol with which a document or file being accessed in the communication network, a location or domain of a file being accessed, a file name, and a file type. It should be noted that the URL is typically translated by a named server in the network to an IP (internet protocol) address. One example of a file type is an HTML file. When such a URL is used to access data, that data may include a document, an application, or another type of application available to an external user. Typically, the application received by the external user has been an HTML format and this property is specified within the URL by a ".html" suffix. When an HTML document or application including a JavaScript program, is received, the JavaScript subroutine is identified through the tag:

<Server>.

The <Server> indicates that a server delivering the HTML file should begin to process JavaScript, instead of HTML, until a matching </Server> tag is detected. The server then accesses the subroutines identified within the HTML file, compiles the subroutines, and sends them to the browser implemented by the external user. The JavaScript program is provided to a data processing system within the web server (114, 116). A CPU within the data processing system parses the JavaScript program to identify instruction and data, including the include function.

When the web server detects an invocation of a function, the web server (114, 116) executes the necessary steps to perform that function in a step 304. If the function is a simulated include function, the function is executed as any other function would be without the server being aware of its special nature. To perform the include function, the web server calls a subroutine corresponding to the inclusion function upon detection of the inclusion instruction. The web server calls the subroutine. For example, when calling a subroutine, the web server will detect the "<Server>" tag from the retrieved HTML code and evaluate the following instructions to determine when a subroutine call exists. Such subroutine calls are in a predefined format that is easily recognized by the web server as performing a function. In JavaScript, a subroutine function is indicated by a list of arguments contained within parentheses. It should be noted that when an "include ( )" command is received by the server, the server is able to identify a function, or a block of code that has a name. Whenever that name is used, the function is called and, therefore, the code within the called function is executed. It should be noted that functions may also be called with parameters that are specified inside the body of the function. The use of functions within JavaScript performs two services, namely organization and linking. It should be noted that the include function of the present invention has the form:

Function Include (x,y) {
   body
}.

It should be noted that variables declared within a body of a function are usually local variables. Local variables are known only within the body of the function and are unknown to outside software programs. It should be noted that global variables are also defined within JavaScript applications and are a same value for every function or subroutine executed therein.

Alternatively, when the include function is retrieved, a set of instructions or parameters in a JavaScript format will be retrieved from a file called by the subroutine. This retrieval function has previously been described in greater detail. This set of instructions is then utilized in each page being served by the web server (114, 116). Subsequently, the web server (114, 116) continues parsing the JavaScript program to determine whether additional include functions have been provided in the JavaScript retrieved from the web site (110) in a step 306. If additional include functions are included, the include function is executed in a manner similar to that described above. If not, the statements retrieved as a result of executing the include function are executed in a step 308. Subsequently, a web page is created and served to a browser of client 112.

The foregoing has provided a general description of operation of the include mechanism of the present invention. An example of operation including one embodiment of the present invention will subsequently be provided. In this example, constants that are used in the JavaScript program are accessed by an include function referred to as "Include_Constants." The Include_Constants function defines variables that are used in implementing the JavaScript program retrieved from the web site. In one embodiment of the present invention, the JavaScript code utilized to call the Include_Constants function may be set forth as follows:

```
<HTML>
<HEAD>
<SERVER>
    INCLUDE_CONSTANTS ( );
```
Subsequently, when the Include_Constants function is called through the JavaScript subroutine calling protocol, the values associated with variables are retrieved therefrom. Thus, for a web page that has been accessed by the web server (114, 116), constants defined within the Include_Constants function are retrieved. It should be noted that a programmer may modify a constant to have a new value within a web page when the web page is provided in the JavaScript format as JavaScript is an interactive language. While this would typically be problematic as constants in a program should not be modified in the middle of the program, the present invention takes advantage of the scoping characteristics of the JavaScript language to ensure that modified constants are not erroneously used in subsequent programs. Specifically, given the unique scoping characteristics of JavaScript, the modified value for the constant only exists while the server is accessing that page from the web site. Thus, when a new page is accessed from the web site, the value of the variables determined therein is again determined by the new Include_Constants function called at the beginning of the web page. Thus, in one embodiment of the present invention, the Include_Constants function is included within a standard header provided for each page formatted according JavaScript controls. Additionally, in another embodiment of the present invention, the Include_Constants function may be used to provide the same constants to a plurality of pages, including sets or related pages.

One example of the code used to implement the Include_Constants function is provided below:

```
// Function: Include_Constants ()
function Include_constants (undefined) }
    // Preferences
    DECIMAL_SEP = ".".           ; // decimal separator
                                   (usually period or
                                   comma)
    DEBIT_SIGN = "-[({<"          ; // debit indicators
    ISO_MARKS = "$USD"            ; // marks must not be
                                   alphabetic
    USE_RED_FOR_NEGATIVE = false  ; // display negative
                                   numbers in red
    ROUND_DECIMALS = false        ; // truncate numbers with
                                   too much precision
    UNDEFINED_VALUE = undefined;
    // error handling
    TRAP_FATAL_ERRORS = true;
    AUTOPROCESS_ERRORS true;
    // default formats
    DEFAULT_ICCCT = "USD";
    DEFAULT_TFCCT = "USA";
    DEFAULT_CFMT = "group=3;gsep=,;sign=();ci=$;fmt=%s%c%n";
}
Cust. Include_Constants ();
```

By executing the code provided above in response to a subroutine call to the Include_Constants function, definitions are retrieved to be used in executing the code:

TABLE 1

| Variable | Usage | Default |
|---|---|---|
| DECIMAL_SEP | separator for decimal numbers | . |
| DEBIT_SIGN | signs to be taken for debits in the parsing of numbers | -[({< |

TABLE 1-continued

| Variable | Usage | Default |
|---|---|---|
| ISO_MARKS | a list of currency symbols and the ISO currency codes they represent, in the format siiisiii . . . | $USD |
| ROUND_DECIMALS | if true, round rather than truncate decimal numbers with extraneous precision | false |
| DEFAULT_ICCCT | default ISO currency code | USD |
| DEFAULT_TFCCT | default internal time format | USA |
| DEFAULT_CFMT | default currency display format | group=3; gsep=,; sign=(); ci=$; fmt=%s%c%n |
| DEFAULT_NFMT | default decimal data display format | sign =· |

It should be noted that the description provided herein is but one example of an implementation of the present invention. It should be noted that many additional implementations may also be utilized to realize the present invention.

While there have been described herein the principles of the invention, it is to be clearly understood to those skilled in the art that this description is made by way of example only and not as a limitation to the scope of the invention. Accordingly, it is intended, by the appended claims, to cover all modifications of the invention which fall within the true spirit and scope of the invention.

What is claimed is:

1. A method for simulating an instruction, comprising the steps of:

receiving a first plurality of instructions in a first computer program, wherein the first computer program is written in a scripting programming language;

detecting a first function instruction in the first plurality of instructions; and executing a subroutine in response to the first function instruction, wherein the subroutine retrieves a plurality of values in the scripting programming language and simulates the instruction using the plurality of values.

2. The method of claim 1, wherein the scripting programming language comprises a JavaScript programming language.

3. The method of claim 1, wherein the plurality of values comprises a plurality of repeatedly executed instructions.

4. The method of claim 1, wherein the subroutine defines a plurality of constants.

5. The method of claim 4, wherein the plurality of constants are accessed by the first plurality of instructions.

6. The method of claim 4, wherein the plurality of constants have a predefined scope.

7. A method for simulating an include function using an interpreted programming language, comprising the steps of:

retrieving a plurality of instructions corresponding to a first application, wherein a first one of the plurality of instructions identifies a first function instruction;

enabling a first data processing device to execute a subroutine in response to the first function instruction;

enabling the first data processing device to access a file in response to execution of the subroutine; and retrieving at least a plurality of items in the interpreted programming language from the file.

8. The method of claim 7, wherein the plurality of instructions are transferred from the first data processing device using a TCP/IP communication protocol.

9. The method of claim 7, wherein the first application is in a hypertext markup language format.

10. The method of claim 7, wherein the first data processing device comprises a web server.

11. The method of claim 10, wherein the plurality of instructions correspond to a plurality of web pages served by the web server to a second data processing device.

12. The method of claim 11, wherein the plurality of values are valid for only a portion of the plurality of web pages in which the subroutine is executed.

13. The method of claim 7, wherein the plurality of values correspond to a plurality of instructions written in the interpreted programming language.

14. The method of claim 7, wherein the plurality of values correspond to a plurality of parameters written in the interpreted programming language.

15. The method of claim 7, wherein the interpreted programming language comprises a JavaScript programming language.

16. The method of claim 7, wherein the plurality of values comprises a plurality of repeatedly executed instructions.

17. The method of claim 7, wherein the subroutine defines a plurality of constants.

18. A data processing system for executing a computer program, comprising:

means for receiving a first plurality of instructions in a first computer program, wherein the first computer program is written in the scripting programming language;

means for detecting a first function instruction in the first plurality of instructions; and means for executing a subroutine in response to the first function instruction, wherein the subroutine retrieves a plurality of values in the scripting programming language and simulates the instruction using the plurality of items.

19. The data processing system of claim 18, wherein the scripting programming language comprises a JavaScript programming language.

20. The data processing system of claim 18, wherein the plurality of values comprises a plurality of repeatedly executed instructions.

21. The data processing system of claim 18, wherein the subroutine defines a plurality of constants.

22. The data processing system of claim 21, wherein the plurality of constants are accessed by the first plurality of instructions.

23. The data processing system of claim 21, wherein the plurality of constants have a predefined scope.

* * * * *